United States Patent [19]

Scheitlin et al.

[11] Patent Number: 4,625,511
[45] Date of Patent: Dec. 2, 1986

[54] EXHAUST PROCESSOR

[75] Inventors: George E. Scheitlin; Mark A. Sickels; Robert T. Usleman, all of Columbus, Ind.

[73] Assignee: Arvin Industries, Inc., Columbus, Ind.

[21] Appl. No.: 639,803

[22] Filed: Aug. 13, 1984

[51] Int. Cl.⁴ .............................. F01N 3/24; F01N 3/02
[52] U.S. Cl. ...................................... 60/299; 55/343; 55/466; 55/484; 60/311; 422/168; 422/170; 422/171; 422/176
[58] Field of Search ...................... 60/297, 299, 311; 422/168, 170, 171, 176; 55/484, 343, DIG. 30, 466

[56] References Cited

U.S. PATENT DOCUMENTS

| 3,879,944 | 4/1975 | Bertsch | 422/171 |
| 4,175,107 | 11/1979 | Iwaoka | 422/180 |
| 4,419,113 | 12/1983 | Smith | 55/DIG. 30 |
| 4,512,147 | 4/1985 | Wong | 55/466 |

FOREIGN PATENT DOCUMENTS 2417435 10/1975 Fed. Rep. of Germany ...... 422/180
1257056 2/1961 France ........................... 422/170

Primary Examiner—Douglas Hart
Attorney, Agent, or Firm—Barnes & Thornburg

[57] ABSTRACT

An "in-line" exhaust processor includes a housing having an inlet for introducing a combustion product from an engine and an outlet for exhausting filtered or otherwise treated combustion product from the housing. A first substrate is situated in a forward or upstream position within the housing to filter combustion product introduced into the housing through the inlet. A second substrate is situated in an adjacent rearward or downstream position within the housing to filter combustion product from at least two sources in the manner explained below. Each substrate includes a cellular structure having opposite inlet and outlet ends and a longitudinal axis. The housing includes a first clam shell portion and a complementary second clam shell portion joined to the first clam shell portion to surround and hold the substrate pair in series. The exhaust processor further includes a bypass channel for diverting a selected portion of the combustion product introduced into the housing through the housing inlet to the second substrate.

30 Claims, 12 Drawing Figures

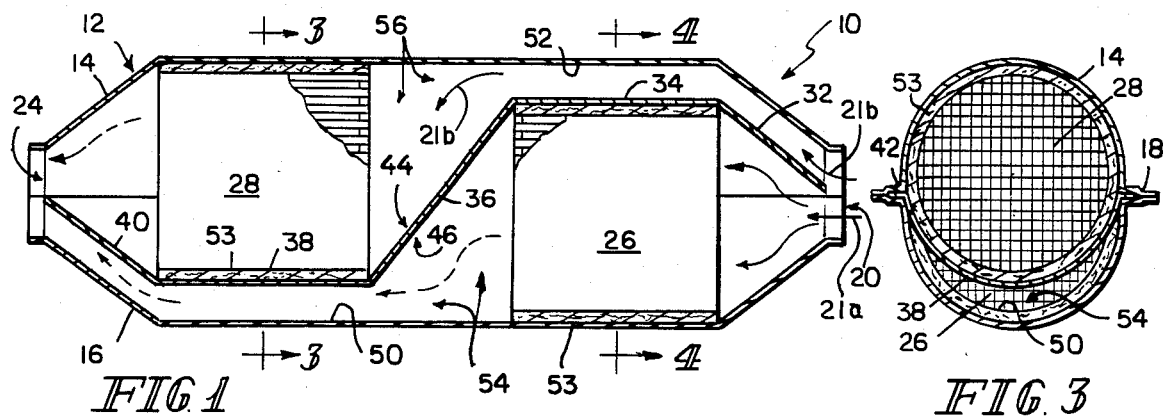
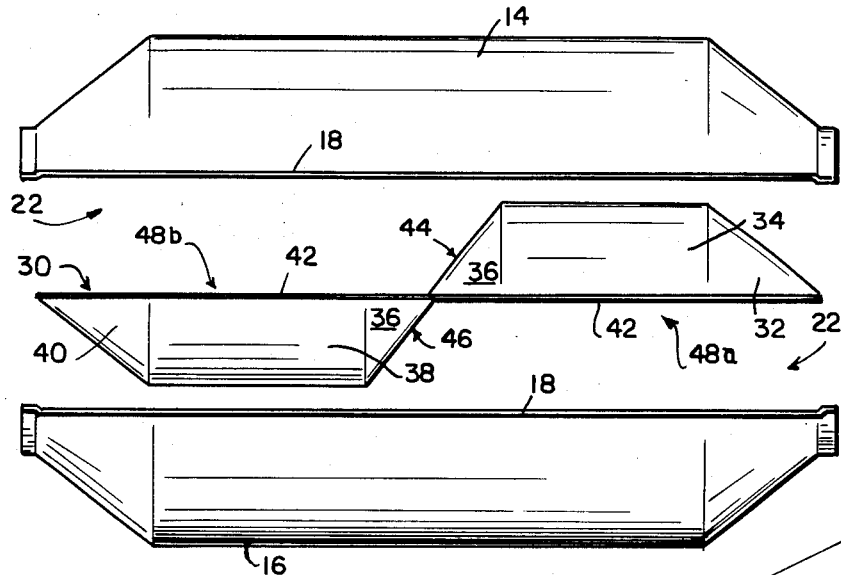
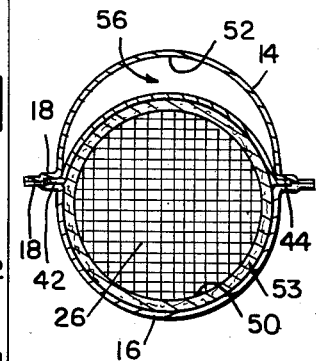
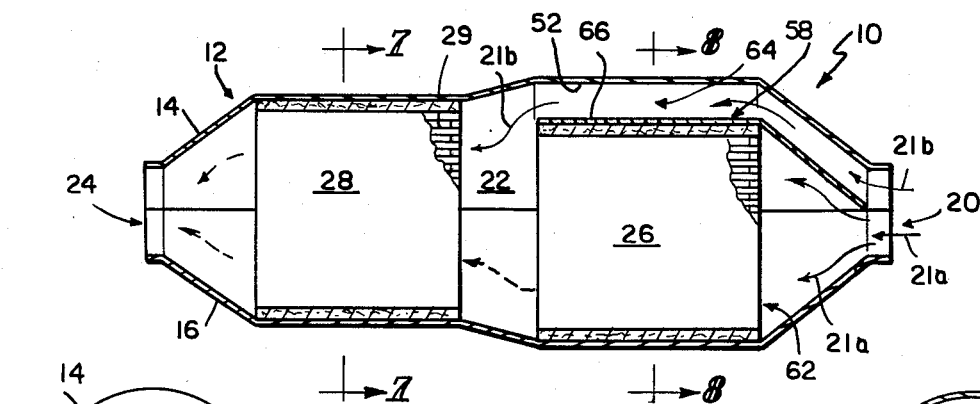
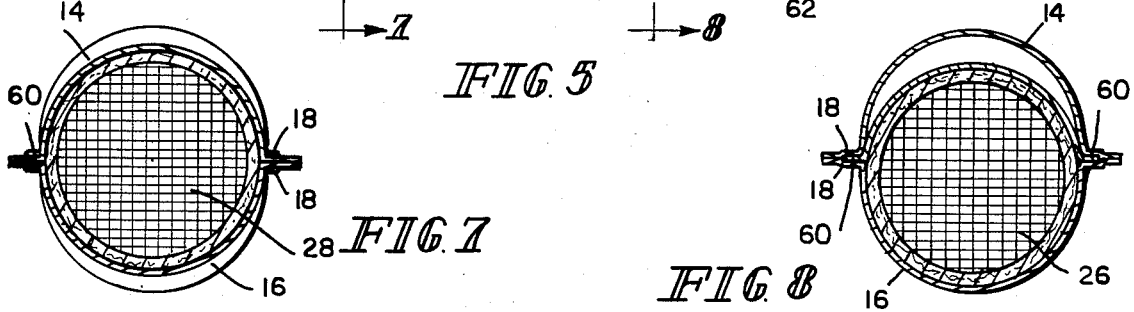
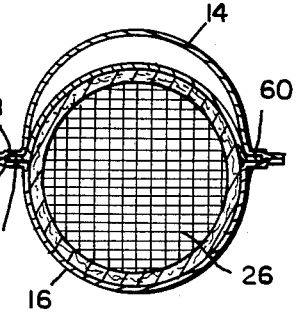

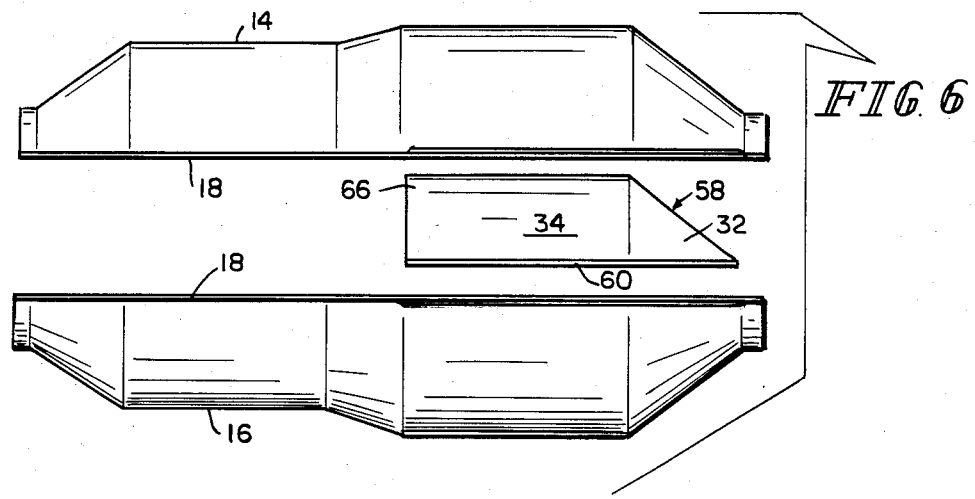
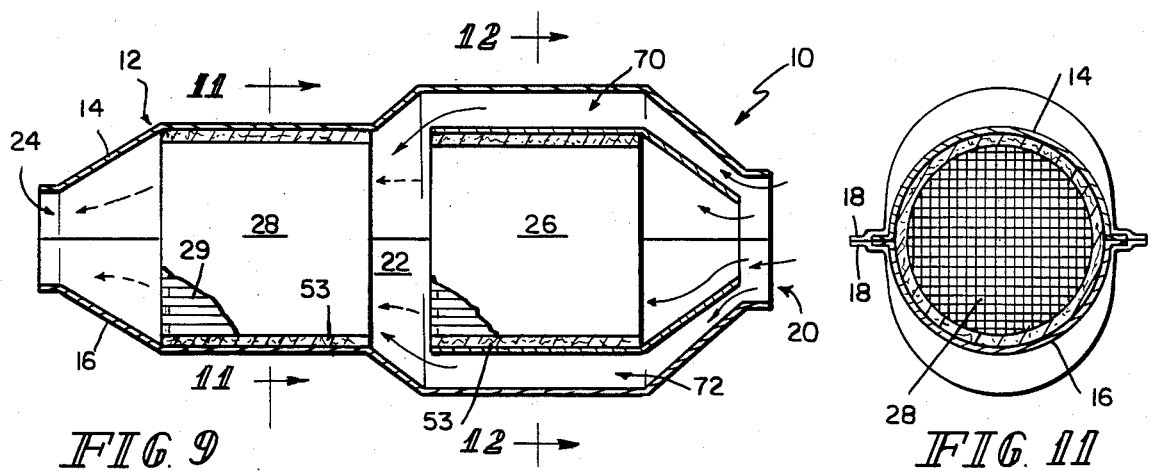
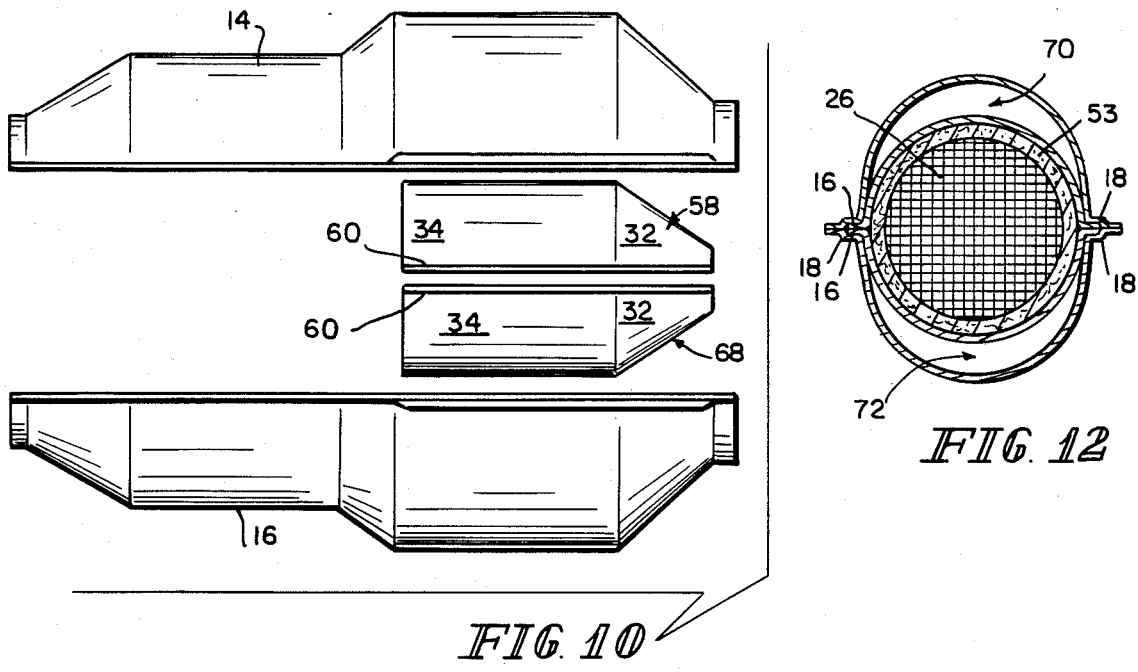

EXHAUST PROCESSOR

This invention relates to exhaust processors usable to filter particulate matter from a contaminated fluid. More particularly, this invention relates to an "in-line" exhaust processor assembly including a processor housing and a pair of substrates mounted in series within the housing for solid particle filtration.

Conventional exhaust processors include a housing in communication with an exhaust manifold of an engine and a single monolithic substrate disposed therein to filter out noxious pollutants from the engine exhaust gases. However, in many cases a single substrate cannot provide a sufficient amount of filtering capacity. Typically, when more than one filter is needed, two substrates are mounted within a housing in a "side-by-side" or "spaced-apart parallel" relation. Hereinafter, such a conventional processor will be referred to as a "parallel processor."

Many types of parallel processors are known. One type includes a single inlet pipe that is coupled to two filters mounted in parallel by means of a "Y design" three way joint. A separate sheet metal housing having its own inlet and outlet ports is provided to house each of said filters. Another type includes a web-shaped common inlet cone that is coupled directly to two filters mounted in parallel. Each filter is provided with its own sheet metal housing. However, the web-shaped inlet cone is of sufficient size to contemporaneously engage the inlet ends of each of the parallel filters.

Manufacturers and users of exhaust processors such as catalytic converters and diesel particulate traps will appreciate the hardships and inconveniences generally associated with the design and installation of all types of conventional parallel processors. One problem relates to inadequate conservation of heat energy. For example, parallel exhaust processors comprising a pair of diesel particulate traps typically cause large quantities of heat energy to be wasted during "regeneration" of the traps. The filter elements or traps must periodically be cleaned to restore functionality thereto. Heat is applied to each trap to burn and oxidize the trapped carbon particles. In a diesel particulate trap of parallel construction, the heat energy required to "clean" each filter element must be conducted to the inlet face of each filter element by a pipe system. Thus, a complex, space-consuming, dual, heat delivery network of pipes and fixtures must be provided for each parallel "trap" processor. A large amount of the heat energy generated during such a regeneration burn is lost as waste exhaust heat that is discharged to the atmosphere. Another problem is that parallel processors are oftentimes not conveniently usable in confined spaces due to their large, unwieldy size and great bulk.

It is known to provide a processor housing having two substrates mounted in an "in-line" or "series" configuration rather than the parallel configuration described above in an attempt to avoid the shortcomings associated with conventional parallel processors. However, known "in line" processors have proven to be unsatisfactory substitutes for conventional parallel processors. One type of conventional in-line processor is provided with a single, long, narrow substrate. It will be appreciated that it is best to construct a substrate using a ceramic material and that it is desirable, for purposes of strength, to keep the outside diameter to length ratio of a ceramic substrate as near to 1.0 as possible. A long narrow substrate is inherently characterized by an unacceptably high ratio and is quite fragile.

Another type of conventional in-line processor is provided with two shorter filters mounted in series within a single passageway in which all of the contaminated exhaust gas introduced into the housing is required to pass. It will be understood that one or both of these substrates can be prematurely clogged with particulate matter unless the "filter efficiency" of each of these in-line substrate filters is carefully "matched". Design and maintenance of this second type of conventional in-line processor is undesirably complicated by the need to install a less efficient filter in the forward or upstream position within the housing and a filter characterized by a higher efficiency in the rearward or downstream position within the housing. Selection of properly "matched" filters is an expensive and time-consuming procedure.

According to the present invention, an improved exhaust processor of "in-line" construction is provided. The novel exhaust processor includes a housing having an inlet for introducing a combustion product from an engine and an outlet for exhausting filtered or otherwise treated combustion product from the housing. A first substrate is situated in a forward or upstream position within the housing to filter combustion product introduced into the housing through the inlet. A second substrate is situated in an adjacent rearward or downstream position within the housing to filter combustion product from at least two sources in the manner explained below. Each substrate includes a cellular structure having opposite inlet and outlet ends and a longitudinal axis. One advantage of the novel processor is that both cellular structures are of short length to minimize fragileness. Another advantage is that both cellular structures are characterized by substantially equivalent filter efficiencies to reduce design complexity and cost. The pair of cellular structures are positioned within the housing in end-to-end relation to be substantially coaxially aligned therein.

The housing is desirably of "clam shell" construction although it is within the scope of the present invention to employ a "stuffed can" construction. The housing preferably includes a first clam shell portion and a complementary second clam shell portion joined to the first clam shell portion to surround and hold the substrate pair in series.

The exhaust processor further includes novel bypass means for diverting or distributing a selected portion of the combustion product introduced into the housing through the housing inlet to the second substrate. Importantly, the bypass means is situated wholly within the housing. Installation of the novel bypass means within an exhaust processor of in-line construction serves to allocate combustion product among the two substrates in substantially equal quantities. This feature advantageously permits installation of two substrates having substantially equivalent "filter efficiencies" since each deployed substrate is exposed to roughly the same volume of contaminated fluid or combustion product.

Provision of such an allocation function in an "in line" exhaust processor is a novel departure from conventional practices. The "diverted" portion of the untreated combustion product is routed directly to the second or downstream substrate and thus entirely bypasses the first or upstream substrate. In addition, the remaining "undiverted" combustion product is routed directly to the first substrate.

According to one preferred embodiment of the invention, the bypass means includes an elongated partition member that is installed along the length of the housing to divide the housing interior into independant first and secon chambers. Each chamber is exposed to the housing inlet and outlet to permit combustion product to be conducted therethrough. The first substrate is desirably mounted in an upstream position in the first chamber in proximity to the housing inlet and the second substrate is desirably mounted in an downstream position in the second chamber in proximity to the housing outlet. The first chamber serves to define one longitudinal path through the processor housing for conducting only the undiverted combustion product to the first substrate for treatment therein and for subsequent exhaustion through the housing outlet. The second chamber serves to define another longitudinal path through the housing for conducting only the diverted combustion product to the second substrate for treatment therein and for subsequent exhaustion through the housing outlet.

According to another embodiment of the present invention, the bypass means includes an elongated partition member or internal shell that is installed in an upstream position extending along only about one-half of the housing to divide the axially forward portion of the housing interior into separate first and second passageways. The first substrate is desirably mounted in the first passageway in proximity to the housing inlet. Thus, the first passageway defines one path for conducting undiverted combustion product to the first substrate for treatment therein and for subsequent exhaustion to the second substrate for treatment therein prior to exhaustion from the housing. In addition, the second passageway defines another path for conducting diverted combustion product directly to the second substrate for treatment therein prior to exhaustion from the housing.

One feature of each of the embodiments of the present invention is the provision in an "in-line" exhaust processor of bypass means for diverting a selected quantity of untreated combustion product to the second substrate for treatment therein. This novel structure causes the flow of combustion product introduced into the processor to be split into substantially equivalent portions. In effect, one-half of the initially untreated combustion product is allocated and conducted to the first substrate for filtration therein, and the other one-half of the untreated combustion product is allocated and conducted to the second substrate for filtration therein. The present invention advantageously permits installation of two conventionally sized substrates having substantially equivalent filter efficiencies within a compact exhaust processor assembly of "in-line" construction.

In this specification and in the claims, the words "an exhaust processor" are intended to refer to various types of catalytic converters and processors, diesel particulate filters, and other particulate traps in connection with which the invention may be used.

The invention can best be understood by referring to the following description and accompanying drawings which illustrate preferred embodiments exemplifying the best mode of carrying out the invention as presently perceived.

FIG. 1 is a view of a longitudinal cross section of an in-line exhaust processor incorporating one of the preferred embodiments of the present invention with portions broken away;

FIG. 2 is an exploded view of the embodiment of FIG. 1 showing the clam shell housing and a partition member;

FIG. 3 is a view of a "downstream" transverse cross section of the embodiment shown in FIG. 1, taken along lines 3—3 of FIG. 1;

FIG. 4 is a view of an "upstream" transverse cross section of the embodiment shown in FIG. 1, taken along lines 4—4 of FIG. 1;

FIG. 5 is a view of a longitudinal cross section of an in-line exhaust processor incorporating another of the preferred embodiments of the present invention with portions broken away;

FIG. 6 is an exploded view of the embodiment of FIG. 5 showing the clam shell housing and a single interior shell;

FIG. 7 is a view of a "downstream" transverse cross section of the embodiment shown in FIG. 5, taken along lines 7—7 of FIG. 5;

FIG. 8 is a view of an "upstream" transverse cross section of the embodiment shown in FIG. 5, taken along lines 8—8 of FIG. 5;

FIG. 9 is a view of a longitudinal cross section of an in-line exhaust processor incorporating another of the preferred embodiments of the present invention with portions broken away;

FIG. 10 is an exploded view of the of the embodiment of FIG. 9 showing the clam shell housing and a pair of interior shells in confronting relation;

FIG. 11 is a view of a "downstream" transverse cross section of the embodiment shown in FIG. 9, taken along lines 11—11 of FIG. 9; and FIG. 12 is a view of an "upstream" transverse cross section of the embodiment shown in FIG. 9. taken along lines 12—12 of FIG. 9.

An exhaust processor assembly 10 of the present invention includes a housing 12 of the clam shell type including an upper half shell 14 and a lower half shell 16. Shell halves 14, 16 are conventionally steel stampings. In final assembly, halves 14, 16 are welded or otherwise joined along shell flanges 18.

The housing 12 further includes a housing inlet 20 to receive a combustion product 21 of an engine (not shown) into a cavity 22 formed by the marriage of the upper and lower half shells 14, 16. Also, a housing outlet 24 is provided to exhaust combustion product from the housing 12.

First and second substrates 26 and 28, respectively, are disposed within the cavity 22 of the housing 12 in a manner to be described. Each substrate is a cylindrically-shaped monolithic cellular structure of conventional diameter and length. The substrate could be a structure having a large number of thin-walled passages 29 extending radially and longitudinally between the ends 20, 24 of the cellular structure. It will be understood that cellular structure could alternatively be of the type used in a diesel particulate trap without departing from the scope of the present invention. Further, the "filter efficiency" of each of substrates 26, 28 is substantially equivalent, in contradistinction to conventional in-line exhaust processors which inherently must use two substrates having different "filter efficiencies". One significant advantage of the present invention is that a pair of substrates conventional size and of similar efficiency are usable in a compact in-line exhaust processor.

In the embodiment of FIGS. 1-4, the exhaust processor 10 includes a partition 30. The elongated partition 30 performs at least three different functions in the present invention. The partition 30 provides means for positioning the substrates 26, 28 within the housing 12 in coaxial alignment and also means for conducting a portion of the combustion product 21 toward and away from each of the substrates 26, 28. The partition 30 is a three dimensional, thin-walled, sheet metal stamping and is constructed to include an inlet cone section 32, a first body section 34, a transition section 36, a second body section 38, and an outlet cone section 40. The partition 30 is installed in the interior cavity 22 of housing 12 by means of peripheral flanges 42 as shown.

The inlet cone section 32 is positioned in close proximity to the housing inlet 20 to interrupt the incoming flow of combustion product 21. The inlet cone section 32 operates to split the flow of combustion product 21 and deflect a portion 21a, 21b of the flow toward either of the two substrates 26, 28. The partition 30 includes a contoured upper surface 44 and a contoured lower surface 46, and is formed to include two oppositely opening hollow receptacles 48a, 48b.

A first receptacle 48a is defined by the contoured lower surface 46 of integral elements 32, 34, and 36. The receptacle 48a opens toward the inwardly-facing surface 50 of lower clam shell half 16 to receive the first substrate 26 therebetween. A second receptacle 48b is defined by the contoured upper surface 44 of integral elements 36, 38, and 40. The receptacle 48b opens toward the inwardly-facing surface 52 of upper clam shell half 14 to receive the second substrate 28 therebetween. Each substrate 26, 28 is supported in its proper position in its respective chamber by any conventional means such as mat 53.

The partition member 30 is installed in housing 12 to divide the housing 12 along its entire length into a first chamber 54 containing the first substrate 26, and a second chamber 56 containing the second substrate 28. Each chamber 54, 56 is in continuous communication with both the housing inlet 20 and outlet 24 to provide two separate longitudinal paths through the housing 12. The first chamber 54 is defined by the inwardly facing surface 50 of lower shell half 16 and the contoured lower side wall 46 of the partition 30. The second chamber 56 is defined by the inwardly facing surface 52 of upper shell half 14 and the contoured upper side wall 44 of the partition 30.

When positioned as shown in FIG. 1, the inlet cone section 32 of the partition 30 operates to split the flow of combustion product 21 admitted into the housing 12 so that about one-half of the flow 21a is deflected into the first chamber 54 and conducted toward the first substrate 26, and the other one-half of the flow 21b is deflected into the second chamber 56 and conducted toward the second substrate 28. In particular, the "diverted" portion 21b of the combustion product 21 is filtered only by the second substrate 28 and wholly bypasses the first substrate 26. A filtered combustion product portion 21b is then discharged from the second chamber 56 through housing outlet 24. The remaining "undiverted" portion 21a is filtered by the first substrate 26, and then discharged from the first chamber 54 through housing outlet 24. The outlet cone section 40 is positioned in close proximity to the housing outlet 24 to shunt the filtered discharge of the first and second substrates 26, 28 toward the single housing outlet 24.

In the embodiment of the invention illustrated in FIGS. 5-8, those elements numbered identically with the embodiment of FIGS. 1-4 perform the same or similar functions. In the embodiment of FIGS. 5-8, the partition 30 is replaced by internal shell half 58 which is of reduced size and includes only inlet cone section 32 and first body section 34. Inlet cone section 32 operates in the manner described above to divert approximately one half of the incoming combustion product 21 to the second substrate 28 so as to wholly bypass the first substrate 26. Internal shell half 58 includes peripheral flanges 60 so as to be rigidly fixable between shell halves 14 and 16.

The first and second substrates 26, 28 are positioned within housing 12 in end-to-end, substantially coaxial relation in this embodiment by placing the first substrate 26 in a first passageway 62 between the internal shell half 58 and the lower shell half 16, and by placing the second substrate 28 between shell halves 14 and 16 as shown best in FIG. 5. The substrates 26, 28 are again mounted in their proper positions using any conventional technique.

In the embodiment of FIGS. 5-8, the second substrate 28 is exposed to the filtered combustion product 21a exhausted from the first substrate 26, in addition to the untreated combustion product 21b which is conducted to the second substrate 28 through a second passageway 64. This second passageway 64 is defined by inwardly-facing surface 52 and the outwardly-facing surface 66 of internal shell half 58 and causes combustion product portion 21b to wholly bypass the first substrate 26.

In operation of the embodiment of FIGS. 5-8, about one-half of the combustion product 21a is filtered by the first substrate 26 while the entire flow of combustion product 21a, 21b is intercepted and filtered by the second substrate 28. One advantage of this feature is that provision of the bypass means guarantees that the in-line exhaust processor of the present invention can continue to use two substantially similar substrates of the same filter efficiency. Another advantage of this feature is that it aids in conserving heat during incineration of trapped solid particles within the substrate. During regeneration of a particulate trap, heat energy waste will be significantly minimized since heat applied to the first substrate 26 will pass through said substrate 26 to aid in the regeneration of the axially adjacent second substrate 28 whereas in conventional processors the heat energy applied to the first substrate 26 is merely discharged to the atmosphere.

In the embodiment of the invention illustrated in FIGS. 9-12, those elements numbered identically with the embodiment of FIGS. 1-8 perform the same or similar functions. In the embodiment of FIGS. 9-12 a companion internal shell half 68 is installed in the housing 12 in confronting relation to the internal shell half 58. Thus installed, second passageway 64 is divided into upper and lower components 70, 72 and is shaped to resemble an oblong annular ring as best shown in FIGS. 11 and 12, rather than the arcuate crescent section(s) of the embodiments of FIGS. 1-8 shown in FIGS. 3, 4, 7, and 8.

Thus, a dual bypass passage 70, 72 is provided around the first substrate 26. One effect of such a feature is that the lower bypass passage 70 and the upper bypass passage 72 each operate to conduct about one-quarter of the combustion product 21 introduced into the housing 12 through the housing inlet 20.

Although the invention has been described in detail with reference to certain preferred embodiments and specific examples, variations and modifications exist within the scope and spirit of the invention as described and defined in the following claims.

What is claimed is:

1. An exhaust processor assembly comprising
a housing including an interior wall, an inlet for introducing a combustion product into the housing and an outlet for exhausting combustion product from the housing,
first and second substrate means for treating combustion product introduced into the housing through the inlet, the first substrate means having an outer boundary, the interior wall of the housing and the outer boundary of the first substrate means cooperating to define a passageway therebetween, and
bypass means for distibuting a portion of the combustion product introduced into the housing through the inlet to the second substrate means for treatment therein through the passageway such that said distributed portion bypasses the first substrate means without flowing inside the outer boundary of the first substrate means to reach the second substrate means.

2. An exhaust processor assembly comprising
a housing including an inlet for introducing a combustion product into the housing and an outlet for exhausting combustion product from the housing,
first substrate means, situated in a forward position within the housing, for treating combustion product introduced into the housing through the inlet, the first substrate means having an outer boundary defining an interior region,
second substrate means, situated in a rearward position within the housing to lie adjacent to the first substrate means, for treating combustion product introduced into the housing through the inlet, and
bypass means, within the housing, for diverting a portion of the combustion product introduced into the housing through the inlet to the second substrate means for treatment therein without flowing through the interior region defined by the first substrate means to reach the second substrate means such that said diverted portion bypass the first substrate means and the remaining undiverted portion enters the interior region defined by the first substrate means,
whereby said diverting portion of the combustion product introduced into the housing is intercepted and treated by only the second substrate means prior to being exhausted from the housing through the housing outlet.

3. The processor of claim 2 wherein the housing further includes a first clam shell portion and a complementary second clam shell portion joined to the first clam shell portion to surround the first and second substrate means.

4. The processor of claim 2 wherein
each of the first and second substrate means includes a structure having opposite inlet and outlet ends and a longitudinal axis, and the bypass means includes
frame means for positioning said pair of structures within the housing in end-to-end relation such that the positioned cellular structures are substantially coaxially aligned within the housing.

5. The processor of claim 2 wherein the bypass means includes channel means for conducting the undiverted portion of the combustion product to the housing outlet for exhaustion therefrom.

6. The processor of claim 4 wherein the frame means includes an elongated partition member for dividing the interior of the housing into first and second chambers, the elongated partition member being rigidly fixed within the housing along the length thereof to cause each chamber to be in communication with the housing inlet and the housing outlet such that the first chamber defines one path through the housing for conducting the undiverted portion of the combustion product and the second chamber defines another path through the housing for conducting the diverted portion of the combustion product.

7. The processor of claim 6, wherein the housing further includes a first clam shell portion and a complementary second clam shell portion, the second clam shell portion being joined to the first clam shell portion to surround both of the structures, the first clam shell portion and one side of the partition member cooperate to define the first chamber, and the second clam shell portion and the other side of the partition member cooperate to define the second chamber.

8. The processor of claim 4 wherein the frame means includes partition means for dividing the interior of an axially forward portion of the housing into a first passageway for conducting the undiverted combustion product and a second passageway for conducting the diverted combustion product, the partition means being rigidly fixed to the housing to cause one mouth of each passageway to be in communication with the housing inlet and the other mouth of each passageway to be in communication with the inlet end of the structure of the second substrate means such that the undiverted combustion product conducted through the first passageway is sequentially introduced into the first and the second substrate means for treatment therein and the diverted combustion product conducted through the second passageway bypasses the first substrate means and is introduced only into the second substrate means for treatment therein.

9. The processor of claim 8 wherein the housing further includes a first clam shell portion and a complementary second clam shell portion, the second clam shell portion being joined to the first clam shell portion to surround both of the substrate structures, and the processor further comprises
means for supporting the structure of the second substrate means between the first and second clam shell portions in proximity to the outlet end of the housing.

10. The processor of claim 8 wherein the partition means includes a shell half which includes a body section for receiving a portion of a substrate structure therein and an inlet cone section for conducting combustion product from the housing inlet to a substrate structure received in the body section.

11. The processor of claim 10 wherein the shell half section is formed to include a receptacle having an open mouth, and the shell half is rigidly fixed to the housing to cause its mouth to open toward the first clam shell portion and its inlet cone section to be in communication with the housing inlet.

12. The processor of claim 9 further comprising
first means for mounting the structure of the first substrate means to the shell half and to the first clam shell portion to be suspended in the first passageway, and second means for mounting the structure of the second substrate means to the first and second clam shell portions to be in communication with both of the first and second passageways.

13. The processor of claim 9 wherein the inlet cone section of the shell half includes forward edge means for interrupting the flow of combustion product introduced into the housing through the housing inlet to segregate the undiverted and diverted portions of the combustion product, the forward edge means and the first clam shell portion cooperate to define the inlet mouth of the first passageway through which the undiverted combustion product is conducted, and the forward edge means and the second clam shell portion cooperate to define the inlet mouth of the second passageway through which the diverted combustion product is conducted.

14. The processor of claim 4 wherein the frame means includes a first shell half and a complementary second shell half, each shell half including a body section for receiving a portion of a structure therein and an inlet cone section for conducting combustion product from the housing inlet to a substrate structure received therein.

15. The processor of claim 14 wherein each body section is formed to include an open mouth, the first shell half is rigidly fixed to the housing to cause its mouth to open toward the first clam shell portion, the second shell half is rigidly fixed to the housing to cause its mouth to open toward its companion first clam shell portion so that the two shell halves are held in confronting relation.

16. The processor of claim 14 further comprising first means for mounting the structure of the first substrate means to the rigidly fixed shell halves to be suspended in the first passageway, and second means for mounting the structure of the second substrate means to the first and second clam shell portions to be in communication with both of the first and second passageways.

17. The processor of claim 7, wherein
the first clam shell portion and said one side of the partition member cooperate to define means for mounting the structure of the first substrate means in the first chamber in proximity to the housing inlet, and
the second clam shell portion and said other side of the partition member cooperate to define means for mounting the structure of the second substrate means in the second chamber in proximity to the housing outlet.

18. An exhaust assembly comprising
a housing including an interior wall, an inlet for introducing a combustion product into the housing and an outlet for exhausting combustion product from the housing,
a plurality of substrate means for treating combustion product introduced into the housing through the inlet, one of the substrate means having an outer boundary and being positioned within the housing in close proximity to the housing inlet, the interior wall of the housing and the outer boundary of said one of the substrate means cooperating to define a passageway therebetween, and
bypass means for distributing a portion of the combustion product introduced into the housing through the inlet to a substrate means for treatment therein through the passageway such that said distributed portion bypasses said one of the substrate means positioned in close proximity to the housing inlet without flowing inside the outer boundary of said one of the substrate means to reach another of the substrate means.

19. The processor of claim 18 wherein the housing further includes a first clam shell portion and a complementary second clam shell portion joined to the first clam shell portion to surround the plurality of substrate means.

20. The processor of claim 18 wherein
each of the plurality of substrate means includes a structure having opposite inlet and outlet ends and a longitudinal axis, and the bypass means includes frame means for positioning said plurality of structures within the housing in end-to-end relation such that the positioned cellular structures are substantially coaxially aligned within the housing.

21. The processor of claim 1, wherein the housing further includes a first clam shell portion and a complementary second clam shell portion joined to the first clam shell portion to surround the first and second substrate means.

22. The process of claim 21, wherein the bypass means includes an elongated partition member mounted in the housing to divide the interior of the housing into longitudinally extending first and second chambers in communication with the housing inlet and outlet, the elongated partition member being configured to position the first and second substrate means within the housing in substantially coaxial end-to-end relation.

23. The process of claim 22, wherein the first clam shell portion includes a first flange, the second clam shell portion includes a second flange, the elongated partition member includes a third flange, and the first, second, and third flanges cooperate to define a single splitline extending along the length of the processor between the housing inlet and outlet.

24. The process of claim 1, wherein the housing further includes a first clam shell portion and a complementary second clam shell portion, the second clam shell portion being joined to the first clam shell portion to surround both of the structures, the first clam shell portion and one side of the partition member cooperate to define the first chamber, and the second clam shell portion and the other side of the partition member cooperate to define the second chamber.

25. The processor of claim 24, wherein
the first claim shell portion and said one side of the partition member cooperate to define means for mounting the structure of the first substrate means in the first chamber in proximity to the housing inlet, and
the second clam shell portion and said other side of the partition member cooperate to define means for mounting the structure of the second substrate means in the second chamber in proximity to the housing oulet.

26. The processor of claim 2, wherein the bypass means includes an elongated partition member mounted in the housing to divide the interior of the housing into longitudinally extending first and second chambers in communication with the housing inlet and outlet, the elongated partition member being configured to position the first and second substrate means within the housing in substantially coaxial end-to-end relation.

27. The processor of claim 26, wherein the first clam shell portion includes a first flange, the second clam shell portion includes a second flange, the elongated partition member includes a third flange, and the first, second, and third flanges cooperate to define a single splitline extending along the length of the processor between the housing inlet and outlet.

28. An exhaust processor assembly comprising a housing including an inlet for introducing a combustion product into the housing and an outlet for exhausting combustion product from the housing, an elongated partition member rigidly fixed within the housing to divide the interior of the housing into only two longitudinally extending chambers, each longitudinally extending chamber being in communication with the housing inlet and outlet, a first of the chambers defining a first delivery path for conducting a portion of the combustion product through the housing, a second of the chambers being arranged in side-by-side relation to the first chamber to define a separate second delivery path for conducting a remaining portion of the combustion product through the housing, first substrate means for treating said portion of combustion product, the first substrate means being positioned in the first chamber, and second substrate means for treating said remaining portion of combustion product, the second substrate means being positioned in the second chamber so that said remaining portion of combustion product is conducted to the second substrate means without flowing through the first longitudinally extending chamber.

29. The processor of claim 28, wherein the housing further includes a first clam shell portion and a complementary second clam shell portion joined to the first clam shell portion to surround the first and second substrate means.

30. The processor of claim 29, wherein the first clam shell portion and one side of the partition member cooperate to define the first chamber, and the second clam shell portion and the other side of the partition member cooperate to define the second chamber.

* * * * *